United States Patent [19]
Justice

[11] Patent Number: 4,875,730
[45] Date of Patent: Oct. 24, 1989

[54] TRUCK BED LOAD ORGANIZER AND STABILIZER APPARATUS

[76] Inventor: Kendall W. Justice, 7727 W. Mulbery, Phoenix, Ariz. 85033

[21] Appl. No.: 255,990

[22] Filed: Oct. 11, 1988

[51] Int. Cl.⁴ .............................................. B60P 3/34
[52] U.S. Cl. .................................. 296/37.5; 296/37.6; 410/135
[58] Field of Search .................. 296/24.1, 37.6, 37.16, 296/76, 37.5; 410/129, 135 X

[56] References Cited

U.S. PATENT DOCUMENTS

| | | | |
|---|---|---|---|
| 1,499,229 | 6/1924 | Laffey | 440/135 |
| 2,697,631 | 12/1954 | Miller | 296/37.6 |
| 4,507,033 | 3/1985 | Boyd | 296/37.6 |
| 4,717,298 | 1/1988 | Bott | 440/129 |
| 4,733,899 | 3/1988 | Keys | 296/24.1 |

Primary Examiner—Robert R. Song
Attorney, Agent, or Firm—H. Gordon Shields

[57] ABSTRACT

Truck bed organizer and load stabilizer apparatus includes a flat material disposed on a truck bed, with a plurality of transversely extending panels which pivot from a down position to an up position. The panels stabilize loads by preventing the movement of loads and accordingly inherently organize the loads. The plurality of panels allows the loads to be located as desired on the bed.

6 Claims, 2 Drawing Sheets

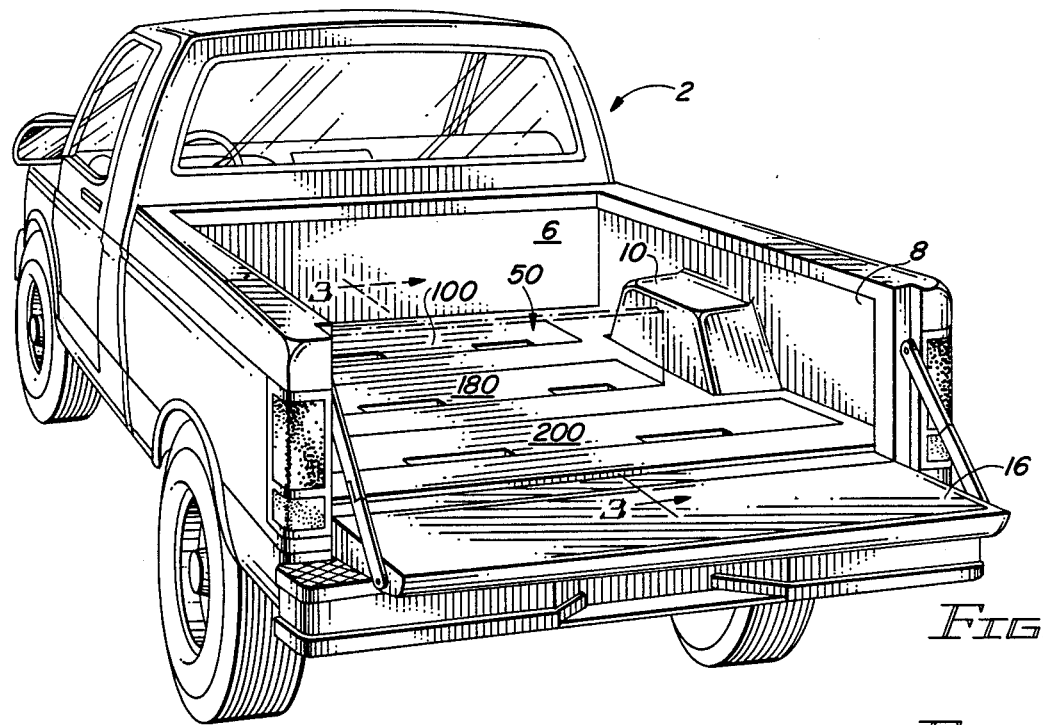
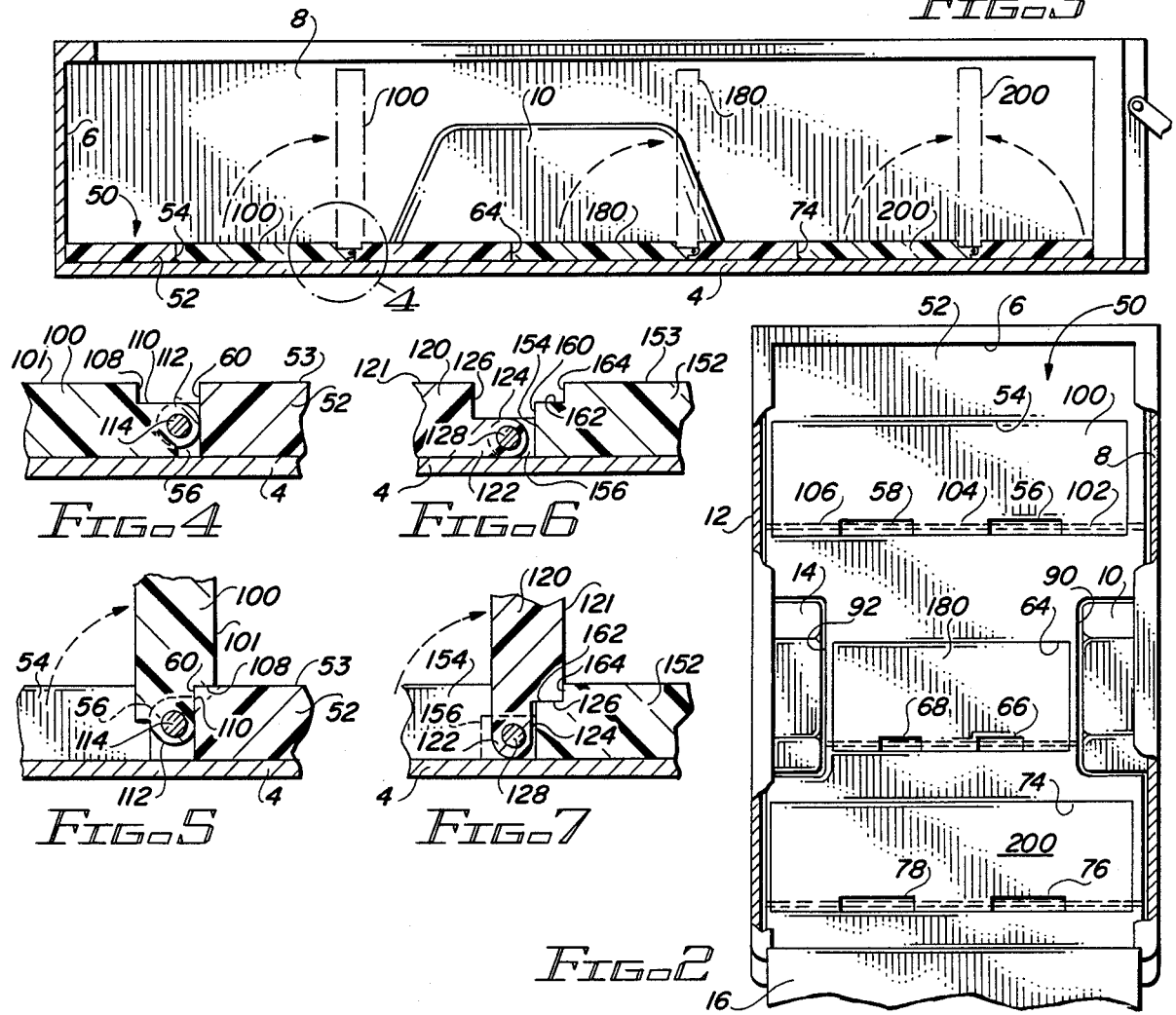

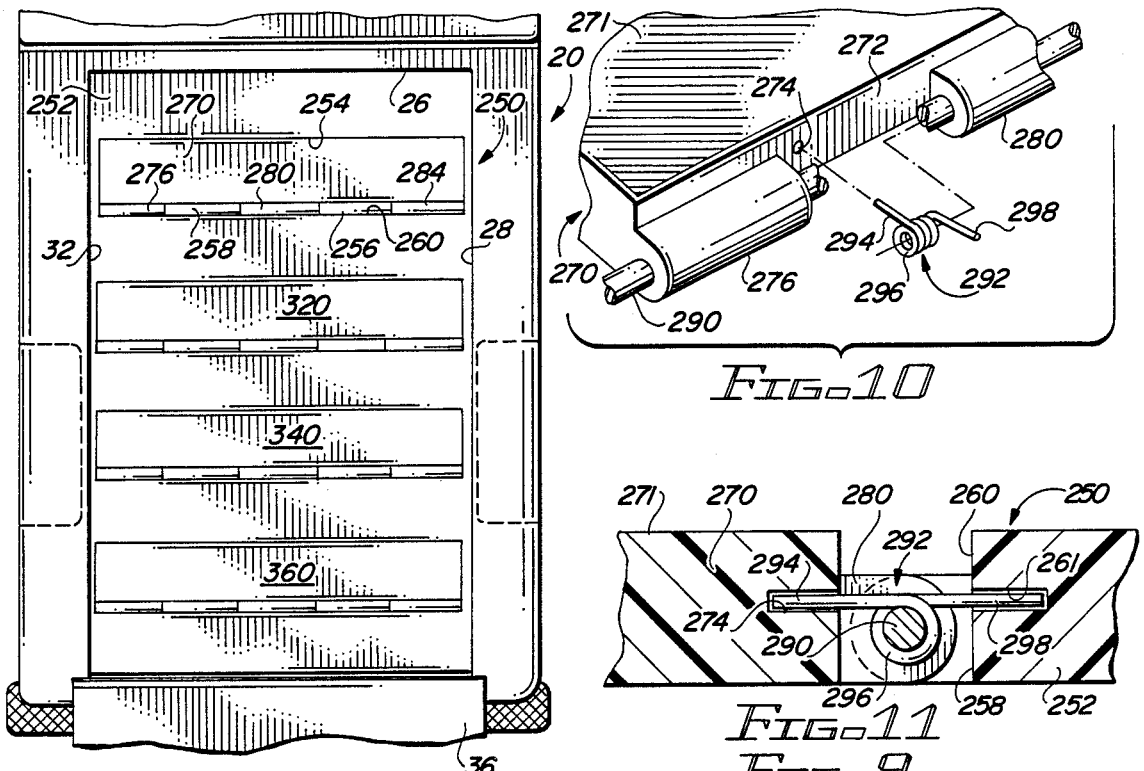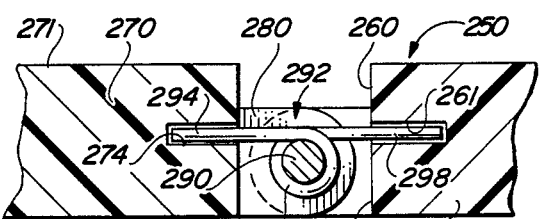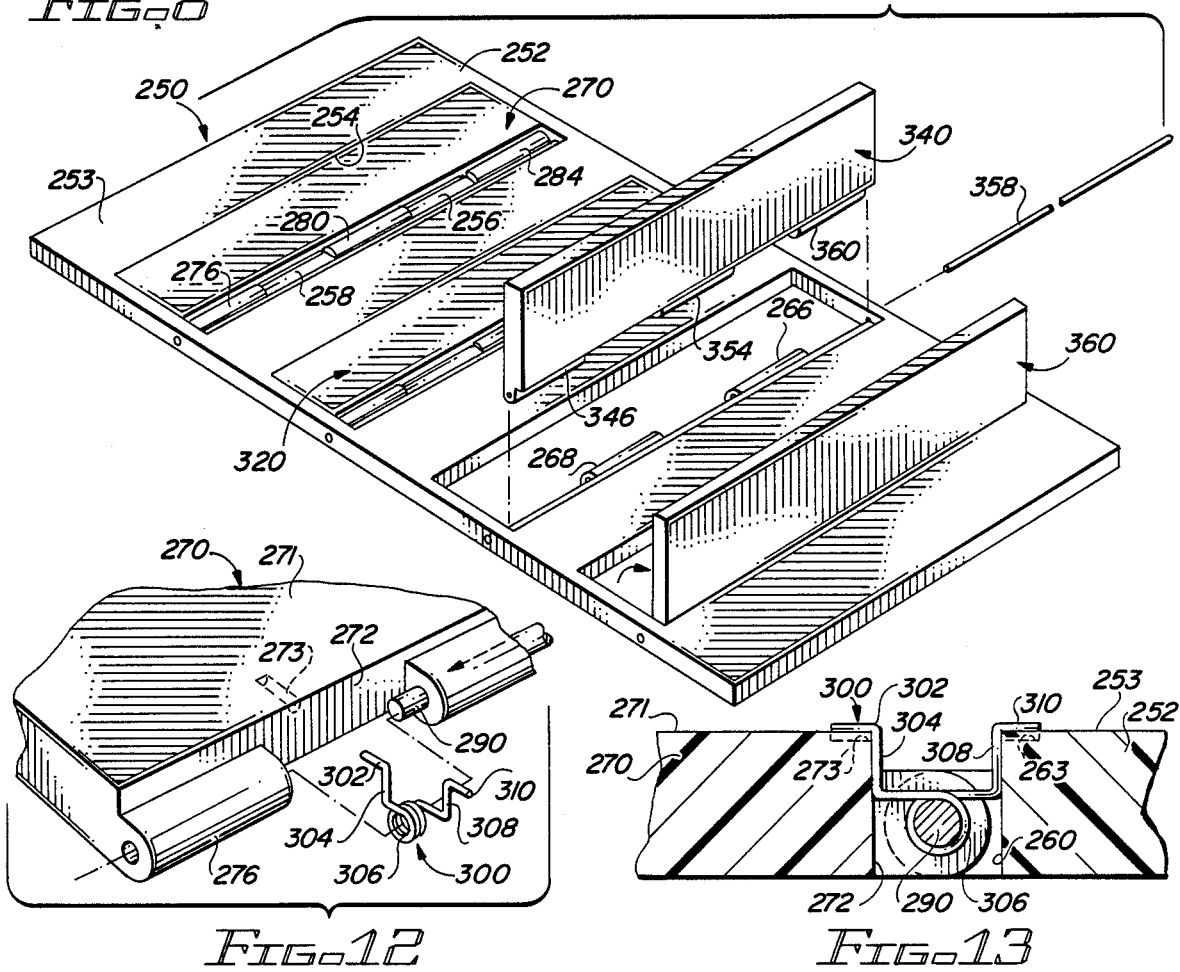

TRUCK BED LOAD ORGANIZER AND STABILIZER APPARATUS

BACKGROUND OF THE INVENTION

1. Field of the Invention

This invention relates to truck beds and, more particularly, to apparatus for organizing and stabilizing loads on truck beds.

2. Description of the Prior Art

Various apparatus have been developed for stabilizing loads on the beds of trucks and/or trailers. However, most of the apparatus are concerned with holding or stabilizing granular cargo loads, as opposed to miscellaneous cargo loads, such as packages, implements, and the like.

For non-professional haulers, straps or ropes are most commonly used for holding load elements in place. This, obviously, is not always convenient and is not always satisfactory.

A number of patents have been granted which attempt to meet particular needs of load stabilization and cargo organization. One such patent, U.S. Pat. No. 3,222,099 (Swallert) discloses a truck cargo area divided by transversely extending partitions. The patent also discloses a foldable side. The partitions are hinged so that they may be folded downwardly or pivoted upwardly. The foldable sides, together with the partitions, divide cargo space primarily for carrying fluids or the like. Fabric containers are secured to the partitions so that when the partitions are in the upwardly extending positions, the containers are in their open position so as to receive fluids or the like.

U.S. Pat. No. 3,901,552 (Stone) discloses a trailer with a plurality of pivotable panels. When the panels are in the upright positions, the trailer cargo area is divided into bins. The apparatus is designed primarily for holding granular material.

U.S. Pat. No. 4,092,051 (D'Orazio) discloses a freight vehicle which includes floor panels which may be raised to partition the vehicle for holding granular material. Beneath the open floor panels are hoppers. When the panels are in their down position, the hoppers are covered, and the cargo space provides a flat, continuous floor.

U.S. Pat. No. 4,221,427 (Sentle, Jr. et al) discloses a trailer which includes floor panels that may be disposed upwardly for carrying granular or bulk cargo. As with the '051 patent, a hopper, with its outlet, is disposed beneath the trailer floor. When the panels are upright, the hopper, and the cargo space, may be used for carrying granular material. When the panels are down, the floor of the trailer is smooth and continuous so that bulk type cargo may be disposed thereon.

U.S. Pat. No. 4,236,854 (Rogers) discloses a cargo brace apparatus for a truck, van, or the like, which is adjustable in three directions. The apparatus includes braces which are movable or adjustable;e relative to each other.

U.S. Pat. No. 4,278,376 (Hunter) discloses a partition system for a pickup truck. The partition is movable on longitudinally extending rails secured to the bed of the truck.

U.S. Pat. No. 4,507,033 (Boyd) discloses another type of load securing apparatus for a truck. The apparatus includes a panel movable on longitudinally extending rails. The rails are secured to the sides of the truck. The panel is pivotable from a down position to an up position. The panel pivots through a full 180 degree of travel, as desired.

In addition to the above-discussed patents, there are other patents designed primarily for use in freight cars. For example, U.S. Pat. No. 1,499,229 (Laffey) discloses a movable bulkhead in a freight car. The movable bulkhead comprises panels supported by braces. The panels and the braces are associated with floor openings for positioning the panels at predetermined locations.

U.S. Pat. No. 3,025,804 (Bruning) discloses another type of bulkhead in a grain carrying car. The bulkhead is actually a plurality of overlapping panels with braces.

U.S. Pat. No. 3,637,094 (Grey) discloses a collapsible bulkhead which includes a pair of A-frames appropriately secured together. Cross members extend between the A-frames to secure the A-frames together.

U.S. Pat. No. 4,606,570 (Neumann) discloses a flexible container for bulk materials disposed on a flat bed vehicle. When the apparatus is folded downwardly, onto the top of the vehicle, it provide a substantially flat floor. When the panels are pivoted upwardly, and with a flexible liner secured to the panels, a bulk container is defined within the flexible liner and within the panels. Appropriate support elements are also included.

SUMMARY OF THE INVENTION

The invention described and claimed herein comprises a base panel disposed on the floor of a cargo carrying vehicle, and a plurality of pivotable panels are disposed on or in and are secured to the base panel. Any of the plurality of panels may selectively be pivoted upwardly for providing stabilizing elements for organizing and stabilizing loads disposed on the base panels on the vehicle.

Among the objects of the present invention are the following:

To provide new and useful load stabilizing apparatus;

To provide new and useful apparatus for protecting the bed of a truck;

To provide new and useful panel apparatus having a plurality of pivoting panels;

To provide new and useful apparatus for stabilizing a load in a cargo carrying portion of a vehicle having a plurality of pivotable panels; and To provide new and useful apparatus having a plurality of panel elements selectively pivotable from a down position, defining a relatively smooth cargo area, to an up position, defining a load stabilizer position.

BRIEF DESCRIPTION OF THE DRAWING

FIG. 1 is a perspective view of the apparatus of the present invention.

FIG. 2 is a top view of the apparatus of FIG. 1.

FIG. 3 is a view in partial section taken generally along line 3—3 of FIG. 1.

FIG. 4 is a view in partial section taken generally from circle 4 of FIG. 3.

FIG. 5 is a view in partial section illustrating sequentially the operation of the apparatus of FIG. 4.

FIG. 6 is a view in partial section of an alternate embodiment of a portion of the apparatus of the present invention.

FIG. 7 is a view in partial section illustrating the operation of the apparatus of FIG. 6.

FIG. 8 is a top view of an alternate embodiment of the apparatus of the present invention.

FIG. 9 is a perspective view of the alternate embodiment of the present invention shown in FIG. 8.

FIG. 10 is an enlarged perspective view of an alternate embodiment of a portion of the apparatus of the present invention.

FIG. 11 is a view in partial section illustrating the apparatus of FIG. 10.

FIG. 12 is a perspective view of another alternate embodiment of a portion of the apparatus of the present invention.

FIG. 13 is a view in partial section illustrating the operation of the apparatus of FIG. 12.

DESCRIPTION OF THE PREFERRED EMBODIMENT

FIG. 1 is a perspective view of a pickup truck 2 with the apparatus of the present invention secured therein. FIG. 2 is a top view of a portion of the pickup truck 2 of FIG. 1. FIG. 3 is a view in partial section taken generally along line 3—3 of FIG. 1. For the following discussion, reference will be directed primarily to FIGS. 1, 2, and 3.

The pickup truck 2 includes, for purposes of the present invention, a bed 4 on which is disposed truck bed load organizer and stabilizer apparatus 50 of the present invention. For purposes of the present invention, the pickup truck 2 includes a front bulkhead 6 at the front of the bed 4. There is a right side wall 8, a right wheel well 10, a left side wall 12, and a left wheel well 14. The side walls 8 and 12 extend rearwardly from the bulkhead 6. The pickup 2 also includes a tailgate 16. The tailgate 16 is shown in its down position in FIG. 1. The apparatus of the present invention is disposed on the bed 4 and shown therein in FIGS. 1, 2, and 3; and is also shown thereon in FIGS. 4, 5, 6, and 7.

The apparatus 50 includes a base 52 which is disposed on the bed 4. There are three cutout portions within the base 52 and in which panels are disposed. The cutouts include a front cutout 54, a middle cutout 64, and a rear cutout 74. In addition, there is a right wheel well cutout 90 and a left wheel well cutout 92. It will be noted, as shown in FIGS. 1 and 2, that the wheel wells 10 and 14 extend into the bed 4, and the apparatus 50 accordingly is configured to allow the wheel wells to extend upwardly from the bed 4 and inwardly with respect to the truck 2 and without interfering with the apparatus 50 and its pivoting panels, as discussed below.

The cutout portions 54, 64, and 74 are generally of a rectangular configuration, with hinge portions 56, 58', 66, 68', and 76, 78, respectively extending inwardly from one wall of each recess. As best shown in FIG. 3, the hinge portions extend upwardly from the base 52, but only part way to the top of the base 52. That is, the hinge portion of the base is not the full thickness or height of the base. Rather, the hinge portions are recessed downwardly from the top of the base 52. The purpose for the recesses of the hinge portions will be discussed in detail below.

As best shown in FIG. 2, the three cutout portions 54, 64, and 74 extend generally laterally, or transversely with respect to the longitudinal axis of the bed 4 of the pickup truck 2. The cutout 54 and the cutout 74 extend substantially for the full width of the base 52, and accordingly substantially the full width of the bed 4. However, the cutout 64 is disposed between the wheel wells 10 and 14, and the width of the cutout 64 is accordingly less than that of the cutouts 54 and 74.

Three panels, a panel 100, a panel 180, and a panel 200, fit into and pivot out of, respectively, the cutouts 54, 64, and 74. The panels 100, 180, and 200 are generally rectangular in configuration, as are the cutout portions into which they extend. However, both the panels and the base 52 include complementary and mating hinge portions which allow the panels to pivot on the base. The hinge portions are recessed downwardly from the top surface of both the base 52 and the respective panels. The configuration of the various hinge portions is best shown in FIG. 2 and in FIGS. 4, 5, 6, and 7. In FIGS. 4 and 5, one particular hinge embodiment is shown, and an alternate hinge embodiment is shown in FIGS. 6 and 7.

FIG. 4 is a view in partial section enlarged generally from circle 4 of FIG. 3. FIG 5. is a sequential view illustrating the pivoting of the panel 100 from its down position as shown in FIG. 4. FIG. 6 is an enlarged view in partial section, similar to FIG. 4, but illustrating the alternate hinge embodiment. FIG. 7 is a view sequentially following FIG. 6, illustrating the pivoting of a panel 120 utilizing the hinge embodiment of FIG. 6. Attention will be specifically directed to FIGS. 4, 5, and 6, 7, below.

The base 52 includes a top surface 53, and two hinge portions 56 and 58 extend outwardly into the cutout 54 downwardly from the top surface 53. A vertical wall 60 extends from the hinge portions 56 and 58, and downwardly from the top surface 53, into the recess 54. The vertical wall 60 extends the full height or thickness of the base 52 except at the hinge portions 56 and 58.

Between the hinge portions 56 and 58, or complementary with the hinge portions 56 and 58, are three hinge portions of the panel 100. The hinge portions of the pivoting panel 100 include a hinge portions 102, a hinge portion 104, a hinge portion 106. As may be best understood from FIGS. 2 and 4, the hinge portions 56, 58, 102, 104, and 106 are all recessed downwardly from the top surface 53 of the base 52, and also downwardly from a top surface 101 of the panel 100, which is in the same plane as the top surface 53 when the panel 100 is in its down position.

Above and on the sides of the hinge portions 102, 104, and 106, and adjacent to the hinge portions 56 and 58, is a vertical wall 108 of the panel 100. The vertical wall 108 is substantially and appropriately aligned parallel to the vertical wall 60. A generally flat or planar wall 110 comprises the top surface of the hinge portions 102, 104, and 106 of the panel 100. When the panel 100 pivots from its down, or horizontal, position shown in FIGS. 1, 2, 3, and 4, to its up position as shown in FIG. 5, the wall 110 is disposed against the wall 60 of the base 52, and the wall 108 of the panel 100 is disposed on the top surface 53 of the base 52. The abutment of the respective walls or surfaces 53, 108 and 60, 110 provide an appropriate stop for the panel 100. Thus, the panel 100 moves through substantially a ninety degree arc from its down position to its up position, and the physical abutting arrangement of the respective walls limits the pivoting of the panel 100 to its position substantially perpendicularly to the plane of the base 50.

Extending through the hinge portions 102, 56, 104, 58, and 106 is a hinge pin 114. The hinge pin 114 preferably extends through all five of the hinge portions.

In FIGS. 6 and 7, an alternate hinge embodiment or arrangement is shown. The primary differences between the hinge embodiment of FIGS. 4 and 5 and the hinge embodiment or arrangement of FIGS. 6 and 7 is in the provision of an additional wall or notch for holding or locking a panel in its vertical orientation. The alternate embodiment is shown in FIGS. 6 and 7 utilizing a panel 120 and a base 152. The panel 120 includes a top surface 121 and an outwardly extending hinge portion 122. Above the hinge portion 122 is a horizontal wall 124. The hinge portion 122 extends outwardly from a vertical wall 126. The vertical wall 126 extends downwardly from the top surface 121.

The terms "horizontal", "vertical", and "outwardly" pertain to the apparatus of FIGS. 6 and 7 in the down position of the panel 120. The base element 152 includes a cutout portion 154. The output portion 154 is, of course, of a generally rectangular configuration, as is the panel 120, which extends into or is disposed in the cutout 154. A hinge element or portion 156 extends outwardly from the cutout 154. The hinge portions 156 extends outwardly from a vertical wall 160. The vertical wall 160 terminates below a top surface 153 of the base element 152. A horizontal wall 162 extends from the wall 160 to a vertical wall or shoulder 164. A notch is defined by the walls 162 and 164. The vertical wall 164 extends downwardly from the top surface 153. A hinge pin 128 extends through the aligned hinge portions 122 and 156.

When the panel 120 pivots on the hinge pin 128, the surface 124 is disposed against the vertical wall 160, and the wall 126 of the panel 120 is disposed against the wall 162. The top surface 121 of the panel 120 is disposed against the vertical wall 164. Thus, the notch defined by the walls or surfaces 162 and 164, and the wall 160, comprise stop elements to limit the pivoting or acurate movement of the panel 120. The embodiment of FIGS. 6 and 7 comprises a double wall stop system, as opposed to a single wall stop system of FIGS. 4 and 5.

FIG. 8 is a top view of an alternate embodiment of the apparatus of the present invention. The primary differences between the embodiment of FIG. 8 and the embodiment of FIG. 1 is simply that the wheel wells of a truck 20 are recessed, while the wheel wells 10 and 14 of the truck 2 extend outwardly into the bed 4. The apparatus 250 includes a base 252 and four pivoting panels, panel 270, panel 320, panel 340, and panel 360. The base 252 includes a top surface 253.

FIG. 9 is a perspective view of the apparatus 250, illustrating two of the panels pivoting upwardly from the base 252. FIG. 10 is an enlarged perspective view of a portion of the panel 270. FIG. 11 is a view in partial section illustrating the hinge and spring arrangement of FIG. 10. For the following discussion, reference will be made to FIGS. 8, 9, 10, and 11.

The pickup truck 20 includes a front bulkhead 26, and a right side 28 and a left side 32, both of which sides extend rearwardly from the bulkhead 26. The truck 20 also includes a tailgate 36. Alternate apparatus 250 is disposed between the walls 28 and 32 and between the bulkhead 26 and the tailgate 36 on the bed of the pickup truck 20.

The alternate embodiment 250 is generally of a rectangular configuration, and four panels are shown in the apparatus 250. The apparatus 250 includes the rectangular base 252, and four openings or cutout areas, including an opening 254 in which is disposed the panel 270. The opening 254 includes two hinge portions, a hinge 256 and a hinge portion 258. The hinge portions 256 and 258 extend outwardly into the opening 254.

The hinge portions 256 and 258 extend outwardly into the opening or cutout 254 from a vertical wall 260.

A relatively short bore 261 (See FIG. 11) extends into the base 252 from the wall 260. The bore 261 receives an arm of a spring 292, as will be discussed below.

The panel 270 includes a top surface 271 and a vertical wall 272. A pair of hinge elements or portions 276 and 280 extend outwardly from the wall 272. Again, as with the apparatus 50 discussed above, the fringe portions 276 and 280 of the panel 270, and the hinge portions 256 and 258 of the base 252, are disposed downwardly from the top surface of the base 252 and the panel 270.

A bore 274 extends inwardly from the wall 272 for receiving a spring arm, as shown in FIG. 11. Hinge pin 290 extends through the hinge portions 276, 258, 280, 256, and 284 of the panel 270 and the base 252.

For purposes of biasing the panel 270 to its downward position, a spring 292 is utilized. The spring 292 is a coil spring which includes an arm 294, a coil 296, and an arm 298. As shown in FIG. 11, the arm 294 extends into the bore 274, and the arm 298 extends into the bore 261. The coil 296 is disposed about the hinge pin 290. In order to utilize the spring 292, there is preferably a space between the adjacent hinge portions of the base 252 and the panel 270. This may be understood best from FIGS. 8, 9, and 11. In FIG. 9, the panel 270 is shown in its downward position, and there is also shown a slight spacing between the adjacent hinge portion 258, 280 and 256, 284. A pair of springs 292 may be disposed in the spaces, as discussed above and as shown in FIGS. 10 and 11.

The panel 320 is also shown in FIG. 9 disposed in its downward or flat position. The panel 340 is shown spaced upwardly from the base 252, and the panel 360 is shown pivoted to its upright position. The panel 340 is shown with three hinge portions 346, 354, and 360.

A hinge pin 358 is shown spaced apart from the base 252 adjacent to the panel 340 and aligned with a pair of hinge elements 266 and 268 of the base 252. FIG. 12 is an enlarged perspective view of a portion of panel 270, illustrating the employment of a spring 300 which does not require the use of the bores, such as the bores 261 and 274 of FIGS. 10 and 11. Rather, the spring 300 includes an arm 302 and an arm 304 which are disposed against the panel 270, and an arm 308 and an arm 310 which are disposed against the base 252. The spring 300 also includes a coil 306, which is disposed about the hinge pin 290.

FIG. 13 illustrates the employment of the spring 300, and the arrangement of the arms 302 and 304 and the arms 308 and 310. The panel 270 includes a top surface 271, and the arm 302 of the spring 300 is disposed on the surface 271. The arm 304 of the spring 300 is disposed against the vertical wall 272. The arm 308 is disposed against the wall 260 of the base 252, and the arm 310 is disposed on the top surface of the base 252.

The use of the spring 300 obviates the requirement of the bores, but does not include the arm elements 302 and 310 on the top surface of the various panels and of the base. However, to provide a continuous top surface, the arms 302 and 310 may be eliminated, or an appropriate notch may extend into grooves. Relatively shallow and short grooves may extend downwardly from the top surfaces of the base 252 and the panel 270 and inwardly from the walls 272 and 308 to receive the arms 302 and 310, if desired. One such groove 273 is shown in phantom in FIGS. 12 and 13, and one such groove 263 is shown in phantom in FIG. 13. The groove 263 extends from the wall 270 and downwardly from the top surface 253.

The depth and length of the grooves 263 and 273 are sufficient to fully receive the arms 310 and 302, respectively, to avoid snagging, etc.

The pivoting panels are shown in the Figures as pivoting from the rear of the panels, remote from the cabs of the truck. Obviously, the panels may pivot from either the front of the panels or from the rear, as desired. Moreover, all of the panels of a single apparatus need not pivot the same. Some may pivot from the front and some may pivot from the rear, as desired. This is illustrated in FIG. 3 by the dotted line arrows by the panels shown in dotted line in their up position. Note in particular the relatively small dotted line arrow by the dotted line panel 200. The convenience of using the apparatus may dictate the desirability of a particular pivoting arrangement.

In the down position, the panels are aligned with the top surface of the base. In the up position, the panels are generally perpendicular to the base.

It will be noted that the spring elements shown in FIGS. 10, 11, 12, and 13 provide a bias to urge the panels to their down position. Nothing is specifically shown to hold or to lock the panels in their up position. Obviously, locking elements could be used to lock the panels in their up position. However, as a practical matter, the load, or part of the load, being organized and/or stabilized will of itself hold a panel, or hold more than one panel, in the up position.

If a load is to be organized or stabilized between two panels, then it may be desirable to utilize some form of lock or securing element for the front panel. A bungee cord, or a strap, or a brace, etc., may be used for that purpose. Such elements are well known and understood.

The apparatus of the present invention allows a load to be organized and/or stabilized in any desired location on a truck bed. Any panel may be selectively pivoted from the down position to the up position, as desired. Which panel or panels is/are pivoted upward for use depends on the size and weight of a particular load, and the desires of the user of the apparatus.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for organizing and stabilizing a load on a truck bed, comprising, in combination:
   base means disposed on the truck bed for supporting a plurality of panels;
   a plurality of cutout portions in the base means;
   panel means disposed in the plurality of cutout portions, including a plurality of panels disposed in the plurality of cutout portions and pivotable from a down position aligned with the base means to an up position generally perpendicular to the base means for organizing and stabilizing the load; and
   first hinge means at the cutout portions, and each panel of the plurality of panels is secured to the first hinge means.

2. The apparatus of claim 1 in which each panel of the plurality of panels is selectively pivotable on the first hinge means in response to the load desired to be organized and stabilized.

3. The apparatus of claim 1 in which each panel of the panel means extends transversely with respect to the truck bed.

4. The apparatus of claim 1 in which each panel of the panel means includes second hinge means complementary to the first hinge means for pivoting the panels.

5. The apparatus of claim 4 in which the plurality of cutout portions each include a vertical wall adjacent to the first hinge means, and the panels are disposed against the vertical walls in their up positions to limit their pivoting.

6. The apparatus of claim 1 in which the plurality of panels are spring biased to their down position.

* * * * *